United States Patent
Tadipatri et al.

(10) Patent No.: US 11,783,363 B2
(45) Date of Patent: Oct. 10, 2023

(54) CHILDREN'S EARN-TO-PLAY APP

(71) Applicant: DPM VENTURES, LLC, Wilmington, DE (US)

(72) Inventors: Prem Tadipatri, Princeton, NJ (US); Dean Soteropoulos, Flemington, NJ (US); Mohan Patalolla, East Brunswick, NJ (US)

(73) Assignee: DPM VENTURES, LLC, Wilmington, DE (US)

( * ) Notice: Subject to any disclaimer, the term of this patent is extended or adjusted under 35 U.S.C. 154(b) by 0 days.

(21) Appl. No.: 17/486,109

(22) Filed: Sep. 27, 2021

(65) Prior Publication Data

US 2022/0101366 A1    Mar. 31, 2022

Related U.S. Application Data

(60) Provisional application No. 63/084,491, filed on Sep. 28, 2020.

(51) Int. Cl.

| | |
|---|---|
| *G06Q 30/02* | (2023.01) |
| *G06Q 30/0226* | (2023.01) |
| *G06Q 20/12* | (2012.01) |
| *A63F 13/73* | (2014.01) |
| *G06Q 20/22* | (2012.01) |
| *G06Q 20/38* | (2012.01) |
| *G09B 5/00* | (2006.01) |

(52) U.S. Cl.
CPC ....... *G06Q 30/0231* (2013.01); *G06Q 20/127* (2013.01); *A63F 13/73* (2014.09); *G06Q 20/123* (2013.01); *G06Q 20/2295* (2020.05); *G06Q 20/381* (2013.01); *G09B 5/00* (2013.01)

(58) Field of Classification Search
USPC .................................................. 705/14, 319
See application file for complete search history.

(56) References Cited

U.S. PATENT DOCUMENTS

| | | | |
|---|---|---|---|
| 2006/0259361 A1* | 11/2006 | Barhydt | G06Q 30/0233 705/14.27 |
| 2008/0254430 A1* | 10/2008 | Woolf | G09B 5/00 434/322 |
| 2014/0257954 A1* | 9/2014 | Tan | G06Q 30/0215 705/14.17 |
| 2014/0272847 A1* | 9/2014 | Grimes | G09B 7/08 434/236 |
| 2014/0278895 A1 | 9/2014 | Grimes et al. | |
| 2014/0308638 A1* | 10/2014 | Stout | G09B 7/02 434/236 |
| 2014/0344951 A1* | 11/2014 | Brewer | G06F 3/0488 726/28 |
| 2016/0225278 A1* | 8/2016 | Leddy | G06Q 50/205 |
| 2016/0303480 A1* | 10/2016 | Lucy | A63F 13/00 |
| 2017/0004719 A1 | 1/2017 | Laud et al. | |
| 2017/0076623 A1* | 3/2017 | Grimes | G09B 7/08 |
| 2017/0213472 A1* | 7/2017 | Huffman | G09B 7/07 |
| 2017/0359715 A1* | 12/2017 | Schultz | H04L 67/125 |
| 2019/0043378 A1* | 2/2019 | Fishkov | G09B 7/00 |
| 2020/0410888 A1* | 12/2020 | Foster | G09B 19/00 |

OTHER PUBLICATIONS

Toward Social Learning Environments; Julita Vassileva; IEEE Transactions on Learning Technologies, vol. 1, No. 4, Oct.-Dec. 2008.*
An Analysis of the Gamification Use in Learning Management System; Lolo et al., 2019 International Conference of Computer Science and Information Technology (ICoSNIKOM).*
Data-Driven Interaction Review of an Ed-Tech Application, Baldominos et al., arXiv:1812.05465v3 [cs.CY] Apr. 22, 2019.*

* cited by examiner

*Primary Examiner* — David J Stoltenberg
(74) *Attorney, Agent, or Firm* — COZEN O'CONNOR

(57) ABSTRACT

A process for controlling device use, the process comprising: receiving, from a first user having a token credit amount, a request to use a play app having a required token amount; determining a play response based on the token credit amount, wherein the determination corresponds to the following: if the token credit amount is greater than the required token amount, then the request is granted; and if the token credit amount is less than the required token amount, then the request is denied.

16 Claims, No Drawings

CHILDREN'S EARN-TO-PLAY APP

CROSS-REFERENCE

This application is related to and claims priority to U.S. Provisional Patent Application No. 63/084,491 filed Sep. 28, 2020, which is incorporated herein by reference.

FIELD

The present disclosure relates generally to a process that controls electronic device use, in particular to a process or an app that regulates a user's use of a play app based on the user's use of a learn app.

BACKGROUND

With the advent of smartphones, laptops, tablets and other portable electronic devices, a child may now have untethered access to the internet and various communication protocols, e.g. phone, video phone, email, text chatting, and text messaging, and a wide variety of digital entertainment. However, parents (including caregivers and other individuals responsible for oversight of children) may want to limit excessive use of such communication protocols to avoid over-exposure. Parents are often keen to keep an eye on their children's behavior including communication, travel and what media and information to which their children are exposed.

Countless teaching and learning techniques are known to parents. And some of these techniques are more effective than others. Further, some techniques may work well for one child and less well for others. In addition, techniques that work for in-person learning may not be suitable for today's world of online content and learning therefrom.

In some cases, parents exercise a quid pro quo parenting technique wherein a child is rewarded for performing a particular task. As a simple example, a child may be allowed to play video games ("play activity") if she first completes her homework ("learning activity").

The ability of parents/caregivers to accurately track the time of children's activities (both for learning and for play) using conventional means has been and remains a challenge. It is unlikely, if not impossible that a parent to accurately keep track of time spend on learning activities and/or play activities.

Even in view of the existing references, the need remains for a process for controlling electronic device use that motivates the child to earn tokens through learning apps, which are then applicable to time on play apps.

SUMMARY

In one embodiment, the disclosure relates to a process for controlling device use. The process comprises the steps of: receiving, from a first user having a token credit amount, a request to use a play app having a required token amount; and determining a play response based on the token credit amount. The determination corresponds to the following: if the token credit amount is greater than the required token amount, then the request is granted; and if the token credit amount is less than the required token amount, then the request is denied. The process may further comprise the step of: allowing play time on the play app if the request is granted, and/or disabling the play app if the request is denied, and/or blocking the first user from using the play app. The process may further comprise the step of adjusting the token credit amount based on using of a learn app, preferably based on use of the learn app, and/or based on parental input. In some cases, the play time is related to the token credit amount, preferably wherein the play time is directly related to the token credit amount. In some cases, the token credit amount is determined by measuring time on a learn app, and the measurement of time may be performed via electronics or electronic media and/or the measurement of time may be conducted while the first user is not in close proximity to a second user. In some embodiments, the process further comprises the steps of: receiving, from the first user having the adjusted token credit amount, an updated request to use the play app; and determining an updated play response based on the updated token credit amount. The determination may correspond to the following: if the adjusted token credit amount is greater than the required token amount, then the request is granted; and if the adjusted token credit amount is less than the required token amount, then the request is denied. The play app may be selected from a play app catalog, and the process may further comprise the step of generating a play app catalog, preferably based on input from a second user. The learn app may be selected from a learn app catalog, and the process may further comprise the step of generating a learn app catalog, preferably based on input from a second user. The process may further comprise the step of receiving input from a second user based on the adjusted token amount.

DETAILED DESCRIPTION

As noted above, parents sometimes exercise a quid pro quo parenting technique wherein a child is rewarded for performing a particular task—leveraging play activities for learning activities. The ability of parents/caregivers to accurately track the time spent on these activities has been and remains a challenge. It is unlikely, if not impossible that a parent to accurately keep track of time spend on learning activities and/or play activities. Even with 100% personal oversight, this would be impossible, especially in cases where parents are looking over multiple children.

The access provided by today's electronic devices opens up children to unlimited amounts of media and information. Some of this information is desirable to children, e.g., play activities/play apps, while other content is less than desirable to the typical youngster, e.g., learning activities/play apps. Further, without advanced connectivity, compilations of children's activities and the time spent thereon is not possible, especially with larger numbers of children. Conventional monitoring and rewarding is highly limited by geography and proximity of the child to the parent.

The inventors have now developed an earn-and-spend concept that also integrates device controls, e.g., electronic device controls, that motivate a user, e.g., a child, to use less-desired learn apps. The method may be employed using electronics and electronic media, e.g., phones, laptops, or tablets. It has been discovered that the disclosed methods accurately track both play time and learn time, and as a result, a more accurate correlation between fun time and study time is advantageously formulated.

Further, the utilization of the aforementioned controls allows the disclosed methods to be employed remotely, e.g., while not in the direct presence of one another, thus beneficially alleviating the geography and proximity restraints that exist conventionally. The measurement of time periods discussed herein in accordance with the disclosed methods, along with the utilization thereof in the earn-and-spend concept, would have been highly unreasonable, if not impossible in conventional situations.

The inventors have now found an effective device control process that leverages a user's desire, e.g., a child's desire, to use play apps to motivate the child to spend a related amount of time on a learn app. In some cases, the processes relate to an "earn-and-spend" concept in which the child earns the privilege of using play apps by spending a related amount of time on a learn app. In doing so, time on play apps is leveraged as currency to motivate the child to use learn apps—the learn time pays for the play time. Without being bound by theory, it is postulated that using such a "carrot" mechanism to entice the child to use learn apps to earn tokens, which can in turn be used on play apps, surprisingly serves as a highly effective motivation technique. Importantly, time spend on play apps, e.g., play app browsing, does not go to waste and leads to/is transformed into learning time.

The processes and devices disclosed herein unexpectedly achieve multiple goals of, inter alia, limiting undesired, excessive use of electronic protocols, while at the same time encouraging use of more-desirable learning-based electronic protocols, which, without such motivation, would go unutilized by the child. In some cases, the motivation is advantageously achieved without constant parental oversight and/or decision-making.

In one embodiment, the disclosure relates to a process for controlling device use. The process comprises the step of receiving, from a first user, e.g., a child, a request to use a play app. In some embodiments, play apps may comprise a gaming application, a social networking application, or a video playing application, or combinations thereof. These are merely exemplary and are not meant to be limiting. Other play apps are contemplated.

The child may have a token credit amount, e.g., an amount of tokens, associated therewith. And the play app may have a required token amount, e.g., an amount of tokens that is required before the play app can be accessed (by the child). The process may further comprise the step of determining a play response, optionally based on the token credit amount. The determination may correspond or may be based on a first conditional protocol:
  if the token credit amount is greater than the required token amount, then the request is granted
  if the token credit amount is less than the required token amount, then the request is denied.

The answer to the first conditional protocol leads to a go/no-go decision as to whether or not the first user will be allowed access to the respective play app. In some cases, the process further comprises the step of allowing play time on the play app if the request is granted. Thus, if the first user has enough learn tokens built up, then the first user is allowed to play the requested play app. In some embodiments, the process further comprises the step of disabling the play app if the request is denied. Thus, if the first user does not have enough tokens built up, then the first user is not allowed to play the requested play app.

In cases where the request is granted, the allowed play time may be related to the token credit amount of the first user. Stated another way, the amount of play time may depend on the amount of learn time that the first user has accumulated, e.g., via use of learn apps. Various play time/token credit amount correlations are contemplated, and the discussion herein is not intended to limit same. The existence of the correlation is one important aspect of the disclose processes. In some cases, the allowed play time is directly related to the amount of learn time that the first user has accumulated. In such cases, the token credit amount may be determined by measuring time that the first user spends on a learn app or on multiple learn apps. For instance, if the first user has accumulated one hour of learn time on learn apps (as a token credit amount), then the first user shall be allowed one hour of play time on play apps, i.e., there is a 1:1 ratio of learn time to play time. In other cases, ratio of learn time to play time is at a ratio other than 1:1. In some cases, the ratio of learn time to play time may be such that the first user is allowed to play a play app for as much time as is built up in the token credit amount.

For example, the first user may be required to have 2 hours of learn time to earn 1 hour of play time. In some embodiments, the amount of time spent on a learn time may be converted to a number of tokens, which tokens may then be summed to arrive at a token amount, e.g., the token credit amount or a required token amount.

The ratio of learn time to play time may vary widely. In some cases, the ratio may be determined by a second user, e.g., a parent. In other cases the ratio of learn time to play time may be determined formulaically, e.g., via a calculation or algorithm or via other suitable manners, and the calculation or algorithm may become a feature or step of the disclosed process. As one example, a parent may set the ratio of learn time to play time at 0.5:1 in response to good behavior by the child (first user). In other cases, the parent may set the ratio of learn time to play time at 2:1 as a punitive measure.

As noted above, in some embodiments, the first conditional protocol may result in denial. In some embodiments, the process may further comprise the step of blocking the first user from using the play app (or other play apps). In such cases, the first user does not have sufficient learn time built up in the token credit amount, and, as such, is not allowed any time on play apps.

In some cases, the learn time may be monitored for active engagement. And the level (if any) of the active engagement may be utilized in determining the token credit amount. For example, if, for the entire amount of learn time on a learn app, the child has been engaged, then the total amount of learn time may be attributable to the token credit amount. On the other hand, if a child has simply opened the learn app and is not actively participating, then not all or only a portion or none of the total amount of learn time may be attributable to the token credit amount. Stated another way, the child may be required to actively use the learn app in order to get credit. And the child cannot simply open the app and let it run for an extended period of time in order to gain credit/tokens.

As discussed above, the accurate and precise measurement of learn time (or play time) is synergistically improved with the utilization of electronics and electronic media. For example, the time spent on internet apps (for either play apps or learn apps), may be tracked/compiled using a phone, laptop, or tablet. Conventional parenting methods do not have the capability for such a degree of monitoring, and as such, are incapable of providing the level of accuracy in time measurement that is possible when the disclosed processes are employed.

In some cases, the process comprises the measurement of time on a learn app (and/or a play app, see discussion below) is performed via electronics or electronic media. For example, a mobile phone may be employed to keep track of the exact time that the child spends on the learning app. This time can advantageously be tracked down to the tenth of a second, which could not be reasonably achieved conventionally. These measurement benefits are also applicable to time allowed on play apps—the measurement of time on a play app may be performed via electronics or electronic media. Again, the use of the accurate measurements, not previously contemplated, synergistically carries through to provide for a significantly more accurate and effective correlation between learn time, token credit amount, and allowed play time. Stated another way, learn time is tracked more accurately, and token credit is given more accurately. As a result, the earn-to-play experience is more fair and accurate for both parent and child.

In some embodiments, the measurement of time is conducted while the first user is not in close proximity to a second user, e.g., the time is measured while the parent is not near the child. The measurement may advantageously be conducted by a third entity, e.g., an app on a phone or tablet, without the need for the parent (second user) to physically monitor, supervise, or conduct the measurement or even be near the child. For example, the position of the child may be greater than 10 feet away from the parent, e.g., greater than 50 feet, greater than 100 feet, greater than 500 feet, greater than 1000 feet, greater than 5000 feet, or greater than 10000 feet.

In some cases, the child's success or diligence on the learn app may be utilized in determining the token credit amount. For example, a positive test score on an app will allow the learn time to be attributable to the token credit amount. Alternatively, if a negative test score is achieved, then only a portion of the learn time may be attributable.

In some embodiments, some play apps may require more tokens than other play apps. And the token requirement for the specific play app that is being requested may be a part of the go/no-go decision. In some cases, not all play apps require the same amount of tokens to be played. In some cases, some learn apps be worth more tokens than other learn apps. Some learn apps may accrue tokens at faster/slower rates than others. The rate at which the learn app tokens are accrued may, in some cases, be a part of the go/no-go decision.

In some cases, the token credit amount may be (subsequently) adjusted to yield an adjusted token credit amount. The manner in which the token credit amount is adjusted may vary widely. For example, the adjustment may be related to a second user, e.g., a parent. As another example, the first user may accumulate more time on a learn app thus increasing the token credit amount. Thus, the process may further comprise the step of adjusting the token credit amount, e.g., based on using of a learn app. As such, the first user may be able to earn more tokens/time to be used as currency for play app use. In some cases, the adjustment of the token credit amount is based on learn app time.

In other embodiments, the adjustment is based on other criteria, such as parental involvement. Thus, the process may further comprise the step of adjusting the token credit amount based on parental input. This can work many ways. For example, the token credit amount may be reduced (by the parent) for bad behavior. In other cases, the token credit amount may be increased (by the parent) for good behavior.

In some cases, the adjustment may be utilized by the parent to influence the learning of the child. For example, if a child is stronger in math than reading, the parent may encourage the child to work more on reading. The amount of token credit given for a particular learning app (reading app A) may be increased if the parent desires that the child pursue the particular learning app over another (math app B). As one exemplary case, the parent may adjust the token credit amount such that the child receives 3 tokens for 30 minutes of time on reading app A, but only receives 1 token for 30 minutes of time on math app B. On the play side, if a parent is less desirous of shooting games over driving games, then parent may adjust the token credit amount such that the child must pay 3 tokens for 30 minutes of time on shooting app A, but only must pay 1 token for 30 minutes of time on driving app B.

In some embodiments, the process further comprises the steps of receiving, from the first user having the adjusted token credit amount, an updated request to use the play app and determining an updated play response based on the updated token credit amount. In cases where an adjustment to the token credit amount is made, a second conditional protocol may be employed:

if the adjusted token credit amount is greater than the required token amount, then the request is granted; and if the adjusted token credit amount is less than the required token amount, then the request is denied.

In some cases, where the adjusted token amount has not been high enough to result in a granting (and as such has been denied), then the parent may have the option of overriding the denial. The process may further comprise the step of receiving input from a second user based on the adjusted token amount. The received input may then result in further adjustment of the token amount, and possibly in an additional employment of the second conditional protocol. In some cases, the process may have the option of adding to the token amount, e.g., based on parental or other input.

In some cases, it may be advantageous to provide a play app catalog from which the play app(s) may be selected. Thus, the play app may be selected from a play app catalog. The generation of the play app catalog may vary widely. For example, the play app catalog may be generated based on outside input, e.g., from a second user (a parent). In such cases, the parent has the ability to control which play apps may be utilized by the child. In other cases, the play app catalog may be generated via a calculation or algorithm or via other suitable manners, and the calculation or algorithm may become a feature or step of the disclosed process.

Similarly, a learn app catalog may be generated and the learn app may selected from a learn app catalog. As was the case for the play app catalog, the learn app catalog may be generated based on outside input, e.g., from a second user (a parent). In such cases, the parent has the ability to control which learn apps may be utilized by the child. In other cases, the learn app catalog may be generated via a calculation or algorithm or via other suitable manners, and the calculation or algorithm may become a feature or step of the disclosed process.

The arrangement of the play apps and/or the learn apps may vary widely. In some embodiments, the apps may stand alone and may be connected through an overall system, e.g., via an overarching control system or app. In some embodiments, the apps are included within the overarching control system or app. The process may, in some cases, be implemented via the overarching control system or app. Databases for learn apps and/or play apps may be established and managed/configured via the overarching control system or app.

In some embodiments, the process includes the step of converting tokens of the token credit amount into another form of (usable) currency. For example, the tokens may be converted to electronic currency, or to credit that may be usable online, or to credit usable as a gift card. This listing is exemplary and is not intended to limit.

In some cases, if the play response request is granted, the process may further comprise allowing the converted currency to be utilized, as discussed herein. For example, if the child has a specific number of tokens built up in her token credit amount, then those tokens may be converted to online credit, e.g., Amazon credit, and the child may make purchases using the converted online credit to purchase goods and services. Again, in this situation, the potential reward of online shopping may serve as motivation to accumulate tokens via learning apps, e.g., to spend time on learning apps.

In some embodiments, the use of the converted currency may be subject to involvement by another user, e.g., a second user, for example a parent. For example, the a parent may have oversight with regard to potential currency use, e.g., online purchases. In some case, the other user may be able to set or define a catalog of potential currency uses, e.g., a list may be created (by the parent) that defines the goods or services the first user is allowed to purchase. In some embodiments, the involvement of another user may involve approval from the other user, e.g., the child's purchase may require approval from the parent.

In some cases, the disclosure is related to a system including a monitoring manager used for controlling device use, e.g., in accordance with the aforementioned process. The monitoring manager may include an enablement engine, a mapping engine, an overseeing user application, a monitoring application program interface ("API"), a user datastore, a contributor application program interface ("API"), and a carrier integration application.

The monitoring manager may be implemented on one or more network-connectable computing systems and need not be implemented on a single system at a single location. The monitoring manager may be configured for communication via a network with other network-connectable computing systems including one or more devices ("controlled devices") corresponding to the first user. Alternatively, the monitoring manager or one or more components thereof can be executed on the controlled device 12 or other system. The overseeing user application may include a web application or other application enabled by the monitoring manager.

The network may include one or more wired or wireless networks, including for example, the internet and wireless carrier systems. The controlled device (and optionally other devices) may include for example a smartphone, laptop computer, or other wired or wireless terminal, preferably configured to operate on a wired or wireless telecommunication network. The operation of the monitoring manager is described herein with respect to the controlled devices. It is recognized that the monitoring manager can operate with other suitable wired or wireless network-connectable computing systems.

Software and/or hardware residing on a controlled device enables a monitoring agent, which can provide various device information and device use information to the monitoring manager via the monitoring API. In some cases, the first user may operate the controlled device with the monitoring agent active.

A functional component may be a hardware or software component of the controlled device, which enables a particular functionality such as electronic messaging, photo messaging, telephone communication, internet usage, camera usage, video camera usage, application execution, access to a graphic user interface, or other device feature.

The disclosed process, in some embodiments, is utilized and/or performed on an app, e.g., as used on a mobile phone, computer, or other electronic device. The process may be implemented with the appropriate coding and/or algorithms as is known in the art. In some cases, the use of the process in combination with the features of the device is synergistically effective.

Specific details are given in the disclosure to provide a thorough understanding of the embodiments. However, it is understood that the embodiments can be practiced without these specific details. In other instances, well-known circuits, processes, algorithms, structures, and techniques can be shown without unnecessary detail in order to avoid obscuring the embodiments. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification is, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. The specification and drawings are, accordingly, to be regarded as illustrative rather than restrictive. Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Implementation of the processes, techniques, blocks, steps and means described herein can be done in various ways. For example, these processes, techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be rearranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

For a firmware and/or software implementation, the methodologies can be implemented with modules, e.g., procedures, functions, and so on, that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, EPROMs, EEPROMs, core memory, magnetic disk storage mediums, optical storage mediums, optical disks, floppy diskettes, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data. Alternatively, the methods may be performed by a combination of hardware and software.

EMBODIMENTS

The following embodiments are contemplated. All combinations of features and embodiments are contemplated.

Embodiment 1: A process for controlling device use, the process comprising: receiving, from a first user having a token credit amount, a request to use a play app having a required token amount; determining a play response based on the token credit amount, wherein the determination corresponds to the following: if the token credit amount is greater than the required token amount, then the request is granted; and if the token credit amount is less than the required token amount, then the request is denied.

Embodiment 2: An embodiment of embodiment 1, further comprising the step of: allowing play time on the play app if the request is granted Embodiment 3: An embodiment of any of embodiments 1 and 2, further comprising the step of: disabling the play app if the request is denied.

Embodiment 4: An embodiment of any of embodiments 1-3, wherein the play time is related to the token credit amount, preferably wherein the play time is directly related to the token credit amount.

Embodiment 5: An embodiment of any of embodiments 1-4, further comprising the step of blocking the first user from using the play app.

Embodiment 6: An embodiment of any of embodiments 1-5, wherein the token credit amount is determined by measuring time on a learn app, wherein the measurement of time is preferably performed via electronics or electronic media and/or wherein the measurement of time is conducted while the first user is not in close proximity to a second user.

Embodiment 7: An embodiment of any of embodiments 1-6, further comprising the step of adjusting the token credit amount based on using of a learn app, preferably based on use of the learn app.

Embodiment 8: An embodiment of any of embodiments 1-7, further comprising the step of adjusting the token credit amount based on parental input.

Embodiment 9: An embodiment of any of embodiments 1-8, further comprising the steps of: receiving, from the first user having the adjusted token credit amount, an updated request to use the play app; and determining an updated play response based on the updated token credit amount, wherein the determination corresponds to the following: if the adjusted token credit amount is greater than the required token amount, then the request is granted; and if the adjusted token credit amount is less than the required token amount, then the request is denied.

Embodiment 10: An embodiment of any of embodiments 1-9, wherein the using of the learn app is performed by the first user.

Embodiment 11: An embodiment of any of embodiments 1-10, wherein the play app is selected from a play app catalog.

Embodiment 12: An embodiment of any of embodiments 1-11, further comprising the step of generating a play app catalog, preferably based on input from a second user.

Embodiment 13: An embodiment of any of embodiments 1-12, wherein the learn app is selected from a learn app catalog.

Embodiment 14: An embodiment of any of embodiments 1-13, further comprising the step of generating a learn app catalog, preferably based on input from a second user.

Embodiment 15: An embodiment of any of embodiments 1-14, further comprising receiving input from a second user based on the adjusted token amount.

While the disclosure has been described in detail, modifications within the spirit and scope of the disclosure will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the disclosure and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the disclosure.

We claim:

1. An automated A process for controlling use of an electronic device, the process comprising:
    monitoring, by a monitoring manager executing on at least one processor of the electronic device, usage of a set of at least one learn app, wherein the monitoring comprises monitoring, via an activity sensor, the usage for active engagement and compiling a learn time data structure;
    accumulating, by the monitoring manager, token credit for a user account based on the usage of the set of at least one learn app, the learn time data structure, and on token credit accumulation criteria;
    receiving, by the monitoring manager, from a first user associated with the user account, a request to use a play app from a set of at least one play app that is independent from the set of at least one learn app;
    in response to the request, producing, by the monitoring manager, a play response based on an accumulated token credit amount associated with the user account, wherein:
    if the token credit amount is greater than a required token amount associated with the play app, then the monitoring manager grants the request and permits usage of the play app by the first user; and
    if the token credit amount is less than the required token amount, then the monitoring manager denies the request;
    wherein the token credit amount is earned by the first user spending time on the set of at least one learn app; and
    wherein measurement of time on a learn app or a play app is performed via electronics or electronic media and is conducted while the first user is not in close proximity to a second user.

2. The process of claim 1, further comprising the step of: allowing play time on the play app if the request is granted.

3. The process of claim 1, further comprising the step of: disabling the play app if the request is denied.

4. The process of claim 1, wherein an amount of play time is related to the token credit amount.

5. The process of claim 1, further comprising the step of blocking the first user from using the play app.

6. The process of claim 1, further comprising the step of adjusting the token credit amount based on usage of the set of at least one learn app.

7. The process of claim 1, further comprising the step of adjusting the token credit amount based on parental input.

8. The process of claim 7, further comprising the steps of:
    receiving, by the monitoring manager, from the first user having the adjusted token credit amount, an updated request to use the play app; and
    in response to the updated request, producing, by the monitoring manager, an updated play response based on the updated token credit amount, wherein:
    if the adjusted token credit amount is greater than the required token amount, then the monitoring manager grants the request and permits usage of the play app by the first user; and
    if the adjusted token credit amount is less than the required token amount, then the monitoring manager denies the request.

9. The process of claim 1, wherein the using of the learn app is performed by the first user.

10. The process of claim 1, wherein the set of at least one play app is selected from a play app catalog.

11. The process of claim 10, further comprising the step of generating the play app catalog base on input from a second user.

12. The process of claim 1, wherein the set of at least one learn app is selected from a learn app catalog.

13. The process of claim 12, further comprising the step of generating the learn app catalog based on input from a second user.

14. The process of claim 1, further comprising receiving input, by the monitoring manager, from a second user based on the adjusted token amount.

15. The process of claim 1, further comprising the step of:
    measuring, via the monitoring manager, time earned on a learn app by a first user; and
    creating, by the monitoring manager, on the device, a data structure comprising the token credit amount based on the earned time.

16. The process of claim 15, wherein the creating comprises the step of:
    compiling, by the monitoring manager, the earned time to form the data structure.

* * * * *